United States Patent [19]

Barber

[11] Patent Number: 4,602,504

[45] Date of Patent: Jul. 29, 1986

[54] PERMANENTLY-INSTALLED TEST FITTING

[76] Inventor: John C. Barber, 3915 Canal Rd., Lake Worth, Fla. 33461

[21] Appl. No.: 706,322

[22] Filed: Feb. 27, 1985

[51] Int. Cl.$^4$ ............................................. G01M 3/04
[52] U.S. Cl. ......................................... 73/49.8; 73/46; 138/89; 277/DIG. 10
[58] Field of Search ................ 73/49.8, 46, 49.1, 49.5; 277/DIG. 10; 138/89

[56] References Cited

U.S. PATENT DOCUMENTS

| | | | |
|---|---|---|---|
| 2,553,267 | 5/1951 | Nedoh | 220/89 A |
| 3,467,120 | 9/1969 | Hill et al. | |
| 3,605,947 | 9/1971 | Salerno et al. | |
| 3,921,556 | 11/1975 | Wood et al. | |
| 3,941,156 | 3/1976 | Metzger | 138/90 |
| 4,044,798 | 8/1977 | Feldstein et al. | 138/90 |
| 4,139,005 | 2/1979 | Dickey | 138/89 |
| 4,289,169 | 9/1981 | Banholzer | 138/117 |
| 4,329,857 | 5/1982 | Kittle et al. | 220/229 |
| 4,376,597 | 3/1983 | Britton et al. | 138/89 X |
| 4,402,516 | 9/1983 | Gans et al. | 277/DIG. 10 X |
| 4,429,568 | 2/1984 | Sullivan | 73/49.8 |
| 4,460,019 | 7/1984 | Condon | 138/90 |

Primary Examiner—Stewart J. Levy
Assistant Examiner—Joseph W. Roskos
Attorney, Agent, or Firm—Steele, Gould & Fried

[57] ABSTRACT

An apparatus and method are provided for pressure testing pipe and fittings systems. A seal has a disk portion and a flange portion. The seal is permanently attached to the inside of a fitting on the distal end of the pipe section to be tested, thereby blocking fluid flow. The section is installed and tested by conventional means. After testing, a pull-tab formed in the seal is removed to permit fluid flow through the seal. Subsequent sections can then be installed and tested.

19 Claims, 13 Drawing Figures

PERMANENTLY-INSTALLED TEST FITTING

BACKGROUND OF THE INVENTION

1. Field of the Invention

This invention relates generally to fittings for pressure testing pipe connections, and more specifically, to permanently-installed blocking test fittings.

2. Description of the Prior Art

Large pipe systems are usually installed by joining together a number of pipe sections. Accordingly, the installation process can involve the formation of hundreds, if not thousands, of joints between these sections. It is desirable to test joints after they have been formed because it is easier to make repairs before the system is completed. Government codes often require such tests.

Blocking apparatus designed to assist pressure testing typically comprise a plug which is placed into a fitting or section of pipe. The plug seals the pipe so that water can be introduced, whereupon the pipe section and joints thereabove can be inspected for leaks. After inspection the plug is removed or otherwise rendered inoperable to allow fluid flow through the section. Prior art apparatus have typically used a pneumatically inflatable plug. The inflatable apparatus can be expensive to use and susceptible to leakage. Also, the elastic material used in these apparatus can dry and rot. They also can burst unexpectedly, causing a gush of water, or worse, during testing.

Sullivan's U.S. Pat. No. 4,429,568 discloses a pressure testing assembly including a T or Y test section. A flapper valve closes the pipe to fluid flow and the pipe above the valve is filled with water through a faucet in the Y or T section. The system is inspected for leaks, after which the flapper valve is opened to remove the water. This apparatus would be expensive to use and time consuming to install.

The present invention provides a simple to use and inexpensive apparatus for pressure testing pipe and fittings. According to the present invention, a test fitting is permanently installed in the pipe system. The test fitting is fashioned with a permanently removable seal such that, when testing is complete, a portion of the seal can be removed, allowing unobstructed fluid flow through the pipe. The present invention also obviates the need to remove a test fitting, and in so doing, disassemble any portion of the pipe system which has already been tested.

SUMMARY OF THE INVENTION

It is an object of the present invention to provide an apparatus for pressure testing pipe and fittings which is inexpensive to fashion.

It is another object of the present invention to provide an apparatus for pressure testing pipe and fittings which will not leak.

It is yet another object of the present invention to provide an apparatus for pressure testing pipe and fittings which will not deteriorate with age.

It is still another object of the present invention to provide an apparatus and method for pressure testing pipe and fittings which is easy to use.

These and other objects are accomplished by a test fitting with a water impermeable barrier adapted to block fluid flow through the pipes. The test fitting includes means for sealably and permanently installing the barrier into a fitting or engaging a distal end of a pipe. The barrier has a frangibly removable seal. When pressure testing is complete, the seal is broken and removed so as to permit fluid flow through the pipe, whereupon additional sections of pipe can be added.

In one embodiment, the barrier has a support ring encircling and sealably engaging its perimeter. The support ring is adapted for fixed attachment to the interior of a fitting. This embodiment is particularly suited for PVC fittings.

In another embodiment, an elastomeric sleeve with internal parallel circumferential flanges engages the barrier therebetween. The sleeve is adapted to also engage the distal ends of a pipe and a fitting which are joined together, with the barrier therebetween. Means are provided to sealably secure the sleeve to the pipes.

In still another embodiment, an elastomeric support flange encircles and sealably engages the perimeter of the barrier. The support flange is adapted to engage an end of a pipe and to so hold the barrier between the ends of the pipe and the fitting to which the pipe is joined. An elastomeric sleeve is adapted to engage the distal ends of the pipe and the fitting with the barrier therebetween. Means are provided to sealably secure the sleeve to the pipe and the fitting.

BRIEF DESCRIPTION OF THE DRAWINGS

There are shown in the drawings embodiments which are presently preferred. It should be understood, however, that the invention is not limited to the precise arrangements and instrumentalities shown.

DETAILED DESCRIPTION OF THE PREFERRED EMBODIMENTS

Figure 2:
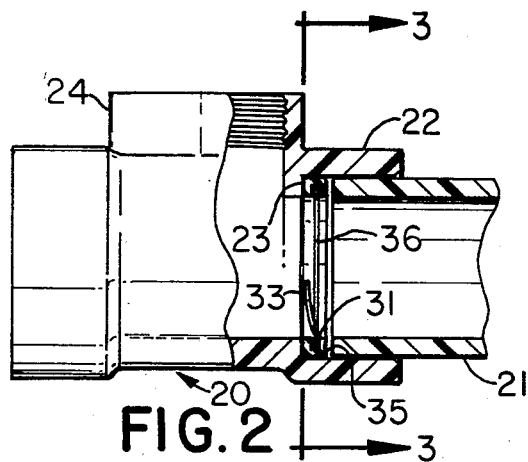
FIG. 2 is a side elevation of the invention as assembled, partially in section.
Figure 3:
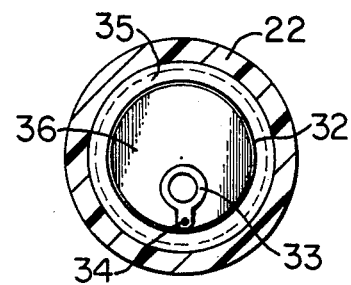
FIG. 3 is a cross-section taken along the line 3—3 in FIG. 2.
Figure 1:
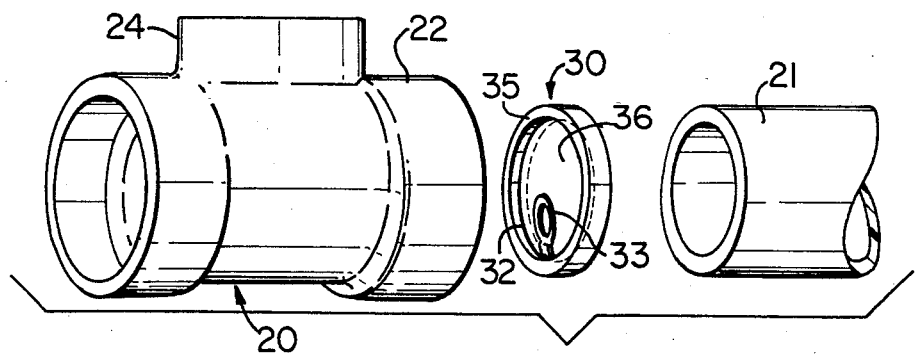
FIG. 1 is an exploded perspective view of the invention.

Referring to FIGS. 1–3, a T-shaped pipe fitting 20 is to be joined with a pipe 21. The pipe fitting 20 will commonly have a T arm 24 and a receiving flange or female end 22 with an inside diameter just exceeding the outside diameter of the distal end of the pipe 21, which forms a corresponding male mating section. The end 22 terminates inwardly at an abutment surface 23. A joint is normally formed by slipping the male section 21 into the end 22 of the pipe fitting 20, where it can engage the abutment surface 23. In plastic pipes as illustrated, a solvent adhesive is spread around the inside surface of the end 22 and on the outside surface of the male section 21 to render the resulting joint water tight. Sometimes the adhesive is applied in a more limited fashion, for example to abutment surface 23 and the mating edge of the end of pipe 21.

After the joint has been formed, it is a common practice to test the joint for leakage. This test can be successfully performed by blocking fluid flow downstream from the joint and causing water to fill the pipe and joint, whereupon any leaks can be easily detected by visual inspection or by other methods known in the art. The obstruction is then removed and construction of the system continues.

It has been found that such testing can be easily and inexpensively performed by fixedly attaching a test fitting 30 to the inside of a fitting so as to block fluid flow therethrough. The test fitting has a water impermeable barrier 31 which can withstand pressures associated with pressure testing. The barrier includes a frangible, removable seal portion 36. When testing is complete, the seal is easily broken and removed. The water is thereby drained, leaving the pipe with little or no obstruction to fluid flow. The system is then ready for the addition of more pipe.

The seal 36 can be similar in construction to the lids found in commercial packaging products such as tennis ball cans. The seal is formed preferably by a scribe cut 32 in the surface of the barrier material. The scribe cut weakens the structure of the barrier material so that a sufficient force will cause the seal to separate from the surrounding barrier material along the scribe cut. The seal can then be removed from the fitting to allow fluid flow through the opening which remains.

The force used to separate the seal from the surrounding barrier material is commonly manual in nature and transmitted to the seal by means such as the pull ring 33. The pull ring is of a size and shape typically found in rings associated with soda cans or tennis ball cans and usually is adapted to receive the index finger. The pull ring could, of course, be adapted to receive more than one finger. It could alternatively be replaced by a structure adapted to receive an instrument which would transmit the force from the hand to the seal. This would be especially desirable where the size or shape of the pipe makes the pull ring difficult to reach with a hand. The pull ring is usually attached to the seal near the scribe cut 32 and forms a lever so that the manual force is transmitted closely to the scribe cut area. This helps to effect initial separation of the seal from the surrounding barrier material. The attachment can be made by any suitable attachment means known in the art such as rivet 34. It is preferable if the attachment means is designed such that the ring is at a 45° angle to the disk surface. This facilitates placement of the finger or a tool into the ring notwithstanding its location within the pipe system.

The test fitting 30 further includes a ring-shaped support 35 to which the barrier is mounted. The support is preferably U-shaped in cross-section so as to receive the barrier between legs of the U. The support can be formed by molding it directly to the barrier.

The installation of the test fitting 30 is easily performed. A suitable adhesive material (for example, the same solvent adhesive if the fitting is plastic) is applied to the outer perimeter of the support 35. Glue is applied to the test fitting, which is then slipped into place inside the end 22 of the pipe fitting 20, against the surface 23 and with the pull ring 33 facing the "T" arm, whereupon the test fitting becomes permanently and sealably attached. The presence of the test fitting 30 does not interfere with the formation of a pipe joint as previously described. The pipe 21 is attached as before with a proper adhesive sealant.

While solvent adhesives are the preferred means for attaching the seal to the inside walls of PVC fittings and the like, it will be apparent to one skilled in the art that any of a number of attachment means could be used. These may vary depending on the different materials chosen for the support 35, and for the different materials which make up the pipe section.

Figure 5:
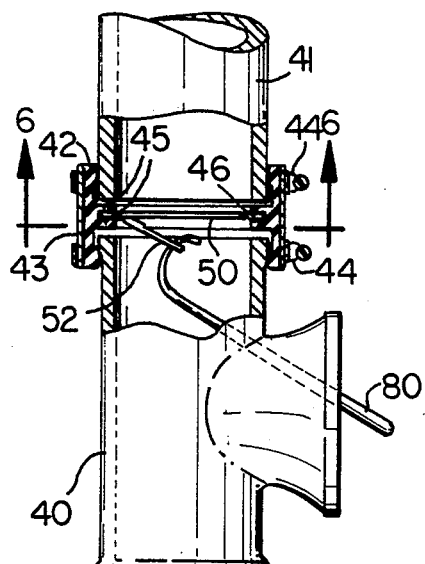
FIG. 5 is a side elevation of the embodiment of FIG. 4 as assembled, partially in section.
Figure 6:
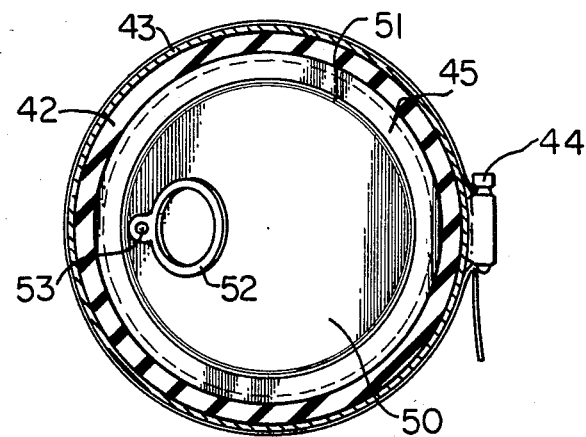
FIG. 6 is a cross-section taken along line 6—6 in FIG. 5.
Figure 4:
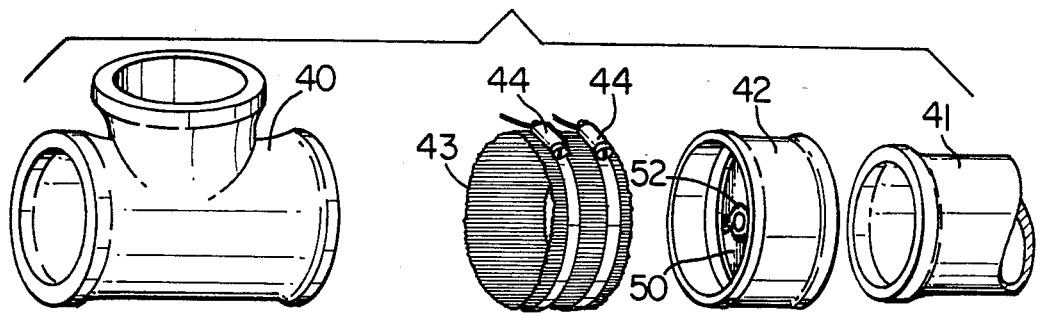
FIG. 4 is an exploded perspective view of another alternative embodiment.
Figure 7:
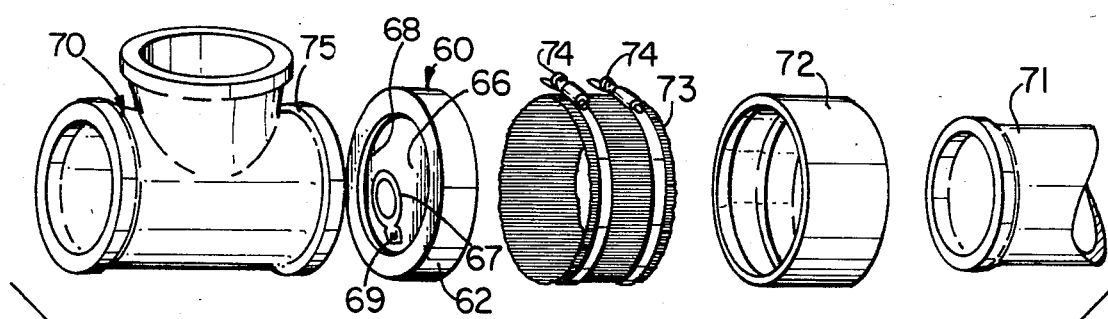
FIG. 7 is an exploded perspective view of an alternative embodiment.
Figure 8:
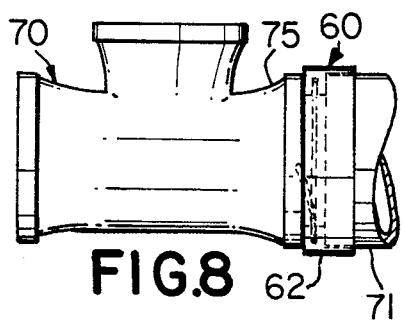
FIG. 8 is a side elevation of the embodiment of FIG. 7, partially assembled.
Figure 9:
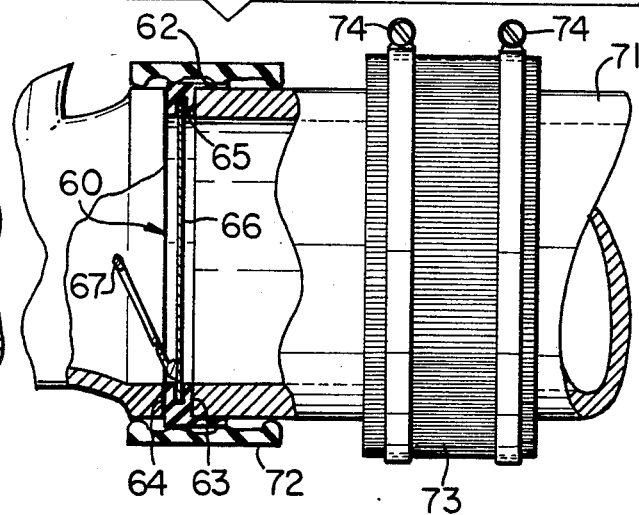
FIG. 9 is a side elevation of the embodiment of FIG. 7 at a stage of assembly subsequent to that of FIG. 8, partially in section.

Referring now to FIGS. 4-6, an alternative embodiment of the invention is shown for use with a different type of pipe joint which is commonly utilized for cast iron pipes. In this type of pipe joint a "T" fitting 40 would directly abut, end to end, a pipe section 41. A rubber sleeve 42 covers the joint, which in turn is held firmly in place by a metal sleeve 43 with sliding screw fasteners 44. Such a joint is shown in Evans U.S. Pat. No. 3,233,922. As before, a sealant can be included if desired. The joint is easily formed by slipping the rubber sleeve 42 and the metal sleeve 43 over an end of pipe. The two pipe ends are brought together, and the rubber sleeve 42 and metal sleeve 43 are positioned over the joint. The screw fasteners 44 are tightened to secure the joint.

As modified in a second embodiment of this invention, the rubber sleeve 42 of such a joint is formed as a test fitting with internal parallel circumferential flanges 45 which receive therebetween a water impermeable barrier 46 with a removable seal portion 50. The flanges 45 preferably have a width equal to that of the pipe thickness so as to form a tight seal with the pipe ends. The seal 50 is formed in the barrier by means such as a scribe cut 51. Pull ring 52 is fastened to the seal 50 near the scribe cut 51 by means such as rivet 53. The rubber sleeve 42 may be directly molded to the barrier 46.

Installation of the test fitting is carried out much as the joint would normally be formed, except that caution must be taken to insure that the side of the fitting with the pull-ring 52 faces the "T" arm so that it can be reached by a finger or tool through that opening. The rubber sleeve fitting 42 should tightly seal the pipe and fitting ends. It is apparent then that this embodiment would be virtually as fast and easy to install as would the conventional joint, but with the pressure testing seal in place and ready for use.

In a third embodiment shown in FIGS. 7-11, the test fitting 60 includes an elastomeric support flange 62 with two parallel flanges 63, 64 extending radially inwardly at one end of the support flange 62. A water impermeable barrier 65 including a seal 66 is received by the groove 68 formed by the flanges 63, 64. The support flange 62 is molded with flanges 63, 64 which can also be directly molded to the barrier 65. The seal 66, as before, is preferably formed by a scribe cut 68 and has means such as pull-ring 67 mounted near the scribe cut 68, as by rivet 69, to effect separation of the seal from the surrounding disk material upon the application of manual force. Pull-ring 67 faces opposite the flange 62.

Figure 10:
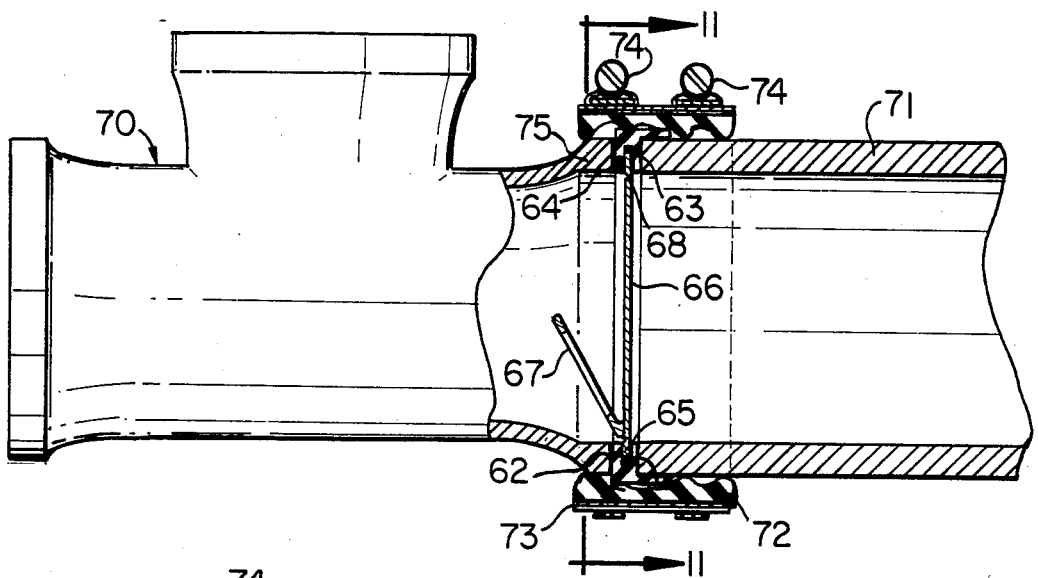
FIG. 10 is a side elevation of the embodiment of FIG. 7 as completely assembled, partially in section.
Figure 11:
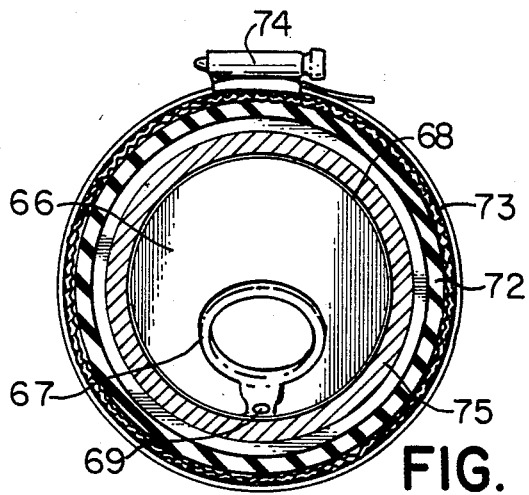
FIG. 11 is a cross-section taken along the line 11—11 in FIG. 10.

This embodiment of the invention would commonly be used with joints of the cast iron type and is suitable for use with a joint apparatus such as that of U.S. Pat. No. 3,233,922 as described above. The "T" section fitting 70 is joined to a pipe 71 by rubber sleeve 72 and metal sleeve 73 with screw fasteners 74. The test fitting 60 is first placed over an end of the pipe 71 (FIG. 8) with the pull ring 67 facing the T arm opening. The support flange 62 grips and seals the pipe 71. The joint is then completed using the conventional technique. The end of the pipe 71 is placed adjacent to the end 75 of the "T" fitting 70, with the test fitting 60 therebetween, and the rubber sleeve 72 over the pipe and fitting ends, and metal sleeve 73 over the pipe 71. The rubber sleeve 72 is positioned over the end of the pipe 71 and the end 75 of the "T" fitting 70 with the test fitting 60 therebetween (FIG. 9) to form a water-tight seal. The metal sleeve 73 is then positioned over the rubber sleeve 72 and the fasteners 74 are tightened to firmly hold the joint together (FIG. 10).

Figure 13:
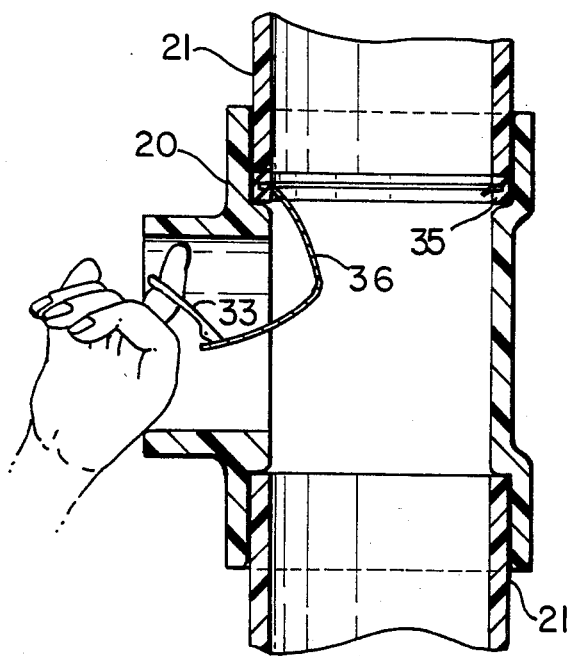
FIG. 13 is a cross-section of the embodiment of FIG. 1 at a stage of use subsequent to that shown in FIG. 12, wherein the frangible section has been nearly completely removed.
Figure 12:
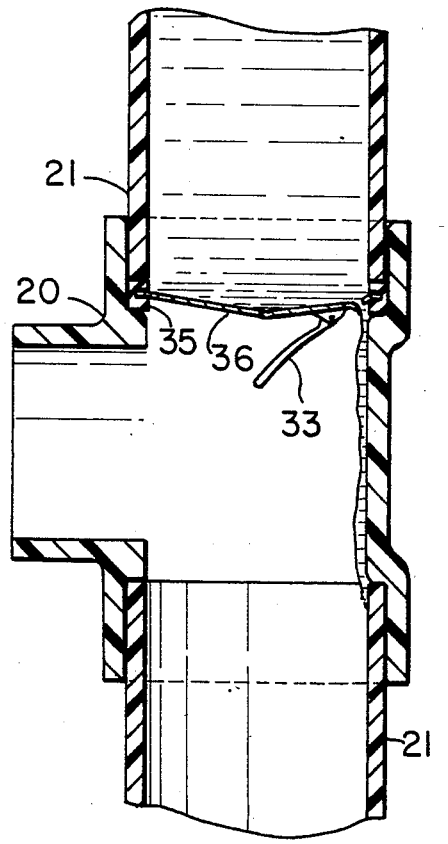
FIG. 12 is a cross-section of the embodiment of FIG. 1 filled with water above the apparatus at the conclusion of a successful test, the frangible section being bent and partially broken.

Pressure testing with the invention may be quickly completed. The system upstream from the fitting is filled with water to subject it to water pressure. The joint is then checked for leaks. If the results are satisfactory, the seal portion is ready to be removed. An index finger or instrument such as hook 80 (FIG. 5) is placed into the ring and the pull-ring is lifted, causing it to pivot on the rivet and to separate an adjacent portion of the seal at the scribe cut from the surrounding disk material (FIG. 12). Water will slowly trickle through the break, thereby avoiding gushing problems associated with the prior art. The ring is also preferably positioned oppositely from the open "T" arm, as shown, during installation such that the initial break will occur at the back of the fitting and the water will not tend to splash out of the open arm as it trickles down. When the water has been drained, the seal is removed by pulling the ring, causing the seal to tear away from the surrounding material at the scribe cut (FIG. 13). Subsequent sections may then be added with the assurance the seal is water tight.

It may be desirable to deepen the scribe cut near the pull-ring to insure that only this portion of the seal is broken away initially, so that water trickles through this break rather than gushes through a larger separation which might otherwise accidentally occur. Other means to achieve initial separation only at a portion of the seal would be apparent to one skilled in the art.

It is preferable that the seal 36 define an area roughly equivalent to a cross section of the inside of the pipe so that, when the seal is removed, fluid flow through the pipe will be unobstructed by remaining portions of the barrier or test fitting.

The scribe cut should not so weaken the disk material as to cause it to yield under pressures normally associated with pressure testing. It should be deep enough, however, to allow relatively easy removal of the interior portion with ordinary manual force.

While a scribe cut has been referred to as the preferred choice in forming the seal, it is also possible to use other constructions for removing the seal material to permit fluid flow through the test fitting. These other constructions would be apparent to one of ordinary skill in the art. It is also possible to use other means known in the art to strengthen the barrier material to resist buckling, and separation, during pressure testing. Typically, these would include ridges, creases or support structure known to perform such a function.

The seal can be made of any material which can withstand pressures associated with pressure testing, is resistant to deterioration with age, and can be suitably fashioned with means for removing the seal in accordance with the herein described inventive principles. Presently preferred materials include aluminum, tin, plastic and rubber. In yet another embodiment, the seal may be designed to "crumble" rather than tear away, so that it could be literally pulled from its mounting flange and removed altogether.

This invention may be embodied in other specific forms without departing from the spirit or essential attributes thereof, and accordingly, reference should be made to the appended claims, rather than to the foregoing specification, as indicating the scope of the invention.

I claim:

1. A test fitting for use in pressure testing pipe and fitting systems during the installation thereof comprising:
   a water impermeable barrier adapted to block fluid flow through said pipe system;
   means for sealably and permanently installing said barrier into a fitting in said pipe and fitting systems; and,
   frangible, removable seal means in said barrier permitting fluid flow therethrough when broken and removed, a remaining portion of said barrier remaining in said fitting, said portion of said barrier being insufficient to impede fluid flow through said fitting.

2. The test fitting of claim 1, wherein said means for installing comprises a support ring encircling and sealably, permanently engaging the perimeter of said barrier, said support ring being adapted for fixed attachment to the interior of a fitting in said pipe system.

3. The test fitting of claim 2, wherein said seal means comprises a looped scribe-cut formed in said barrier.

4. The test fitting of claim 3, wherein said scribe cut loop is substantially coincident with the inside circumference of said pipe.

5. The test fitting of claim 3, wherein said seal means further comprises means for transmitting a manual force to said looped scribe-cut.

6. The test fitting of claim 5, wherein said means for transmitting a manual force to said looped scribe-cut comprises a ring secured to said seal means near said scribe cut.

7. The test fitting of claim 6, wherein said scribe cut is deeper nearest said ring.

8. The test fitting of claims 2, wherein said seal means further comprise strengthening means.

9. The test fitting of claim 8, wherein said strengthening means comprises ridges formed in said seal means.

10. A test fitting for use in pressure testing pipe and fitting systems during the installation thereof, comprising:
    a water impermeable barrier adapted to block fluid flow through said pipe system;
    means for sealably and permanently installing said barrier into a fitting in one of said pipe and fitting systems, comprising an elastomeric sleeve having internal parallel circumferential flanges, said flanges engaging said barrier therebetween, said sleeve adapted to engage an opposing distal end of a pipe to be joined to a fitting with said barrier between said pipe and fitting ends, and means for sealably securing said sleeve to said pipe and fitting; and, frangible, removable seal means in said barrier permitting fluid flow therethrough when broken and removed.

11. A test fitting for use in pressure testing pipe and fitting systems during the installation thereof comprising:

a water impermeable barrier adapted to block fluid flow through said pipe system;

means for sealably and permanently installing said barrier into a fitting in said pipe and fitting systems, comprising an elastomeric support flange encircling and sealably engaging the perimeter of said barrier, said support flange being adapted to engage a distal end of a pipe and abutting a fitting on an opposite side to be joined to said pipe with said barrier between said pipe and fitting ends, with an elastomeric sleeve over said support flange and said pipe and fitting ends, and a rigid support sleeve radially outward of said elastomeric sleeve; and, frangible, removable seal means in said barrier permitting fluid flow therethrough when broken and removed.

12. The test fitting of claims 10 or 11, wherein said seal means comprises a looped scribe-cut formed in said barrier.

13. The test fitting of claim 12, wherein said scribe cut loop is substantially coincident with the inside circumference of said pipe.

14. The test fitting of claim 12, wherein said seal means further comprises means for transmitting a manual force to said looped scribe cut.

15. The test fitting of claim 4, wherein said means for transmitting a manual force to said looped scribe cut comprises a ring secured to said seal means near said scribe cut.

16. The test fitting of claim 15, wherein said scribe cut is deeper nearest said ring.

17. The test fitting of claim 10 or 11, wherein said seal means further comprises strengthening means.

18. The test fitting of claim 17, wherein said strengthening means comprises ridges formed in said seal means.

19. A method of pressure testing fittings and pipe systems during the installation thereof, comprising the steps of:
(a) permanently installing a test fitting with a water impermeable barrier into a system of fittings and pipes which blocks fluid flow through said system;
(b) filling the pipe system with water to subject said system to water pressure, said system being checked for leaks; and
(c) permanently removing removable, frangible seal means from said barrier to allow fluid flow through said pipe system.

* * * * *